March 13, 1956 J. E. HASSLER Re. 24,129
CUTTING CHAIN FOR SAWS
Original Filed April 1, 1940 3 Sheets-Sheet 1
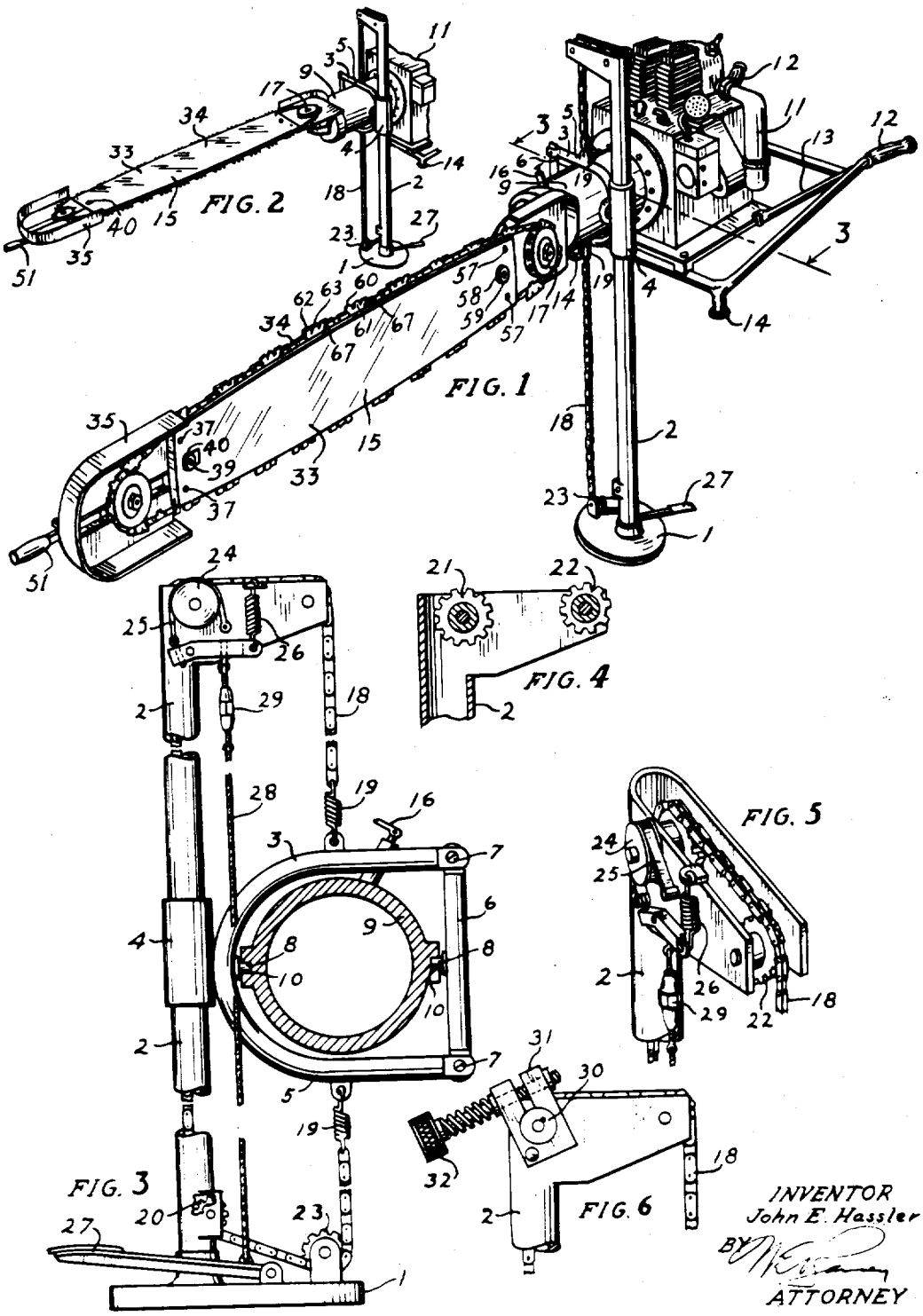

CUTTING CHAIN FOR SAWS

Original Filed April 1, 1940 3 Sheets-Sheet 2

INVENTOR
John E. Hassler
BY
ATTORNEY

CUTTING CHAIN FOR SAWS
Original Filed April 1, 1940 3 Sheets-Sheet 3
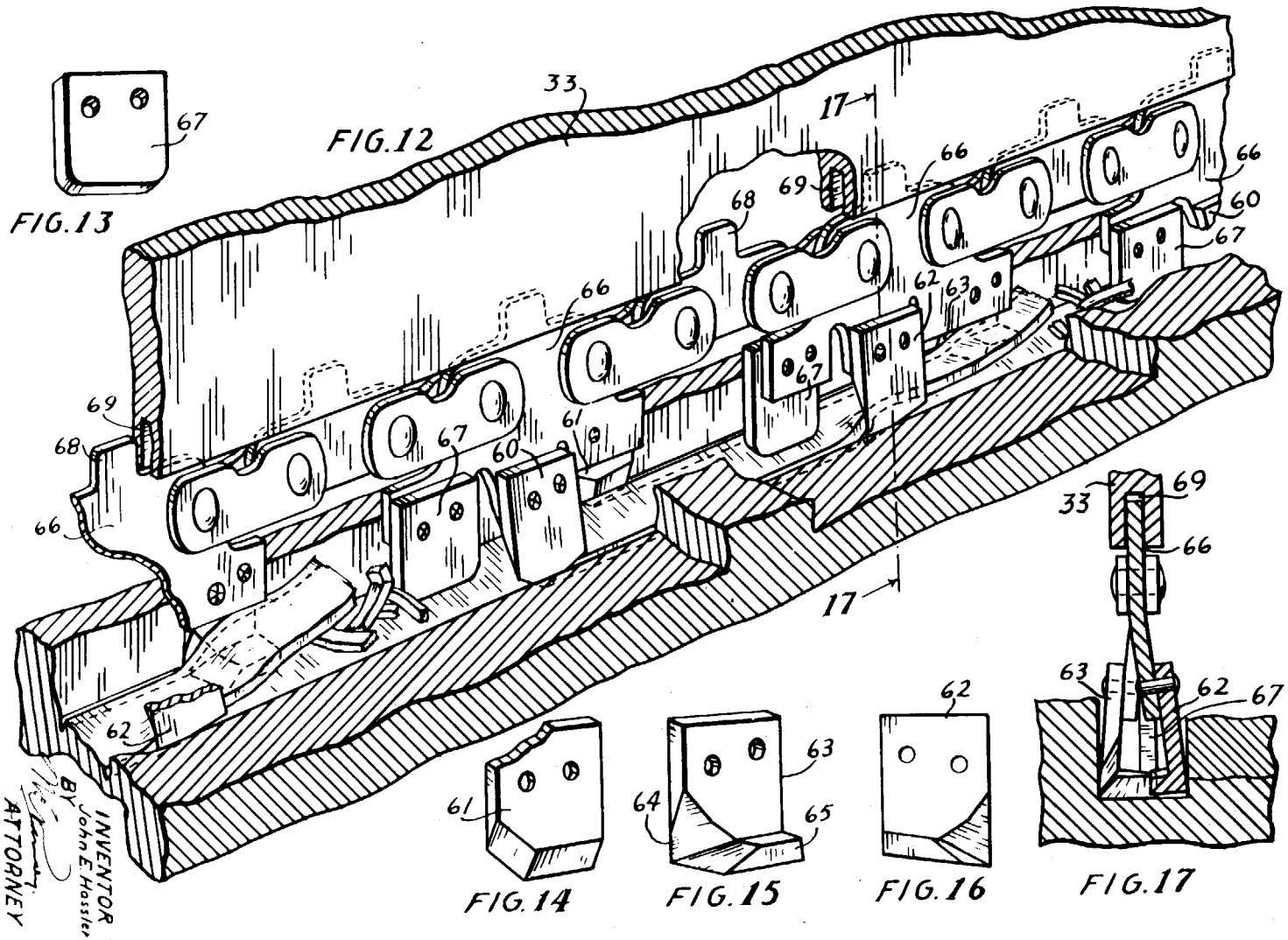

United States Patent Office

Re. 24,129
Reissued Mar. 13, 1956

24,129

CUTTING CHAIN FOR SAWS

John E. Hassler, deceased, late of Portland, Oreg., by Borg-Warner Corporation, Chicago, Ill., assignee Original No. 2,326,854, dated August 17, 1943, Serial No. 327,199, April 1, 1940. Application for reissue March 16, 1955, Serial No. 495,837

17 Claims. (Cl. 143—135)

Matter enclosed in heavy brackets [ ] appears in the original patent but forms no part of this reissue specification; matter printed in italics indicates the additions made by reissue.

The principal object of my invention is to provide an improved method and means for sawing wood whereby a reasonable cutting speed may be maintained with little power. I achieve said result, in one respect, by following a new sequence of cutting operations. It has heretofore been common practice, particularly where wood was being cut crossgrain, to define the kerf to be cut by means of cutting teeth, and then to remove the wood from the kerf by means of chisel-type raker teeth. Thus the second of these two operations has comprised both cutting the wood loose and removing it. I now propose to divide this second operation into two steps, first loosening the wood in the kerf by a slicing operation and then removing it lengthwise of the kerf by drag teeth that do no cutting.

I achieve said result in another respect by providing a chain type saw wherein a depth gage and a pair of wood slicing elements are secured to common links, some of said pairs of wood slicing elements comprising side cutters for defining the sides of the kerf, and other alternate pairs of slicing elements comprising bottom routers for slicing the wood free of the bottom of the kerf. I find that a satisfactory cutting speed can be maintained with this arrangement at a materially lower lineal speed. The steady operation of this type of saw, resulting largely from the use of depth gages on the same link with a pair of cutting teeth or routers, produces a smooth kerf without waste of cutting effort, whereas with chain type saws heretofore known, a jagged kerf has been produced as a result of much duplication of cutting operations.

A further object of my invention is to provide a chain type sawing machine whose cutting member may be easily operated in any desired position. I achieve said result by providing a vertical standard on which the saw is mounted in such a way that it may readily be moved up or down. I then mount the cutting member so that it may be pivoted about two perpendicular axes to saw vertically, horizontally, or at intermediate angles.

Chain type saws heretofore known have been objectionable particularly when they have been used for falling trees because it has not been possible to quickly remove the saw from the tree when the latter is about to fall. It is frequently necessary to drive a wedge in the kerf of the saw, which prevents the saw being removed in the ordinary way; it becomes necessary to withdraw the saw lengthwise. The outer end of the cutting member must be provided with a handle and a sheave or sprocket for the chain to run over, and it is desirable, for reasons hereinafter discussed, that the means for producing tension in the chain be located at said outer end also. All of these elements must either be made so thin that they may be withdrawn through the kerf, or they must be readily removable.

This seemingly simple problem is really extremely difficult of solution in a practical manner. It is imperative that the aforesaid removable members be quickly removable. When a large tree falls, the workmen and their machine are in a highly dangerous position. When the tree begins to move, it is necessary for the men to retreat as quickly as possible to a safe position, and to take their saw with them.

A further object of my invention is to provide a chain type saw that may be quickly removed lengthwise from the kerf. I achieve said object by providing a removable tailpiece for the cutting member, said tailpiece including a handle, sheave for the chain, and means for tensioning said chain.

Other objects and advantages of my invention will be disclosed with reference to the accompanying drawings, in which:

Fig. 1 is a perspective view of a sawing machine embodying my invention;

Fig. 2 is a small scale perspective view of the machine shown in Fig. 1, the cutting member being shown rotated into the horizontal plane;

Fig. 3 is an enlarged foreshortened sectional and elevational view taken along the line 3—3 in Fig. 1;

Fig. 4 is a fragmentary sectional detail view of the upper portion of the structure shown in Fig. 3;

Fig. 5 is a fragmentary perspective view of said upper portion;

Fig. 6 is a fragmentary side elevation of a modified form of said upper portion;

Fig. 12 is a large scale fragmentary perspective view of the cutting member of Fig. 1, said member being shown cutting a piece of wood;

Fig. 13 is a perspective view of one of the teeth shown in Fig. 12;

Fig. 14 is a perspective view of another of said teeth;

Fig. 15 is a perspective view of still another of said teeth;

Fig. 16 is a side elevation of another of said teeth; and

Fig. 17 is a fragmentary sectional view taken along the line 17—17 in Fig. 12.

Figure 7:
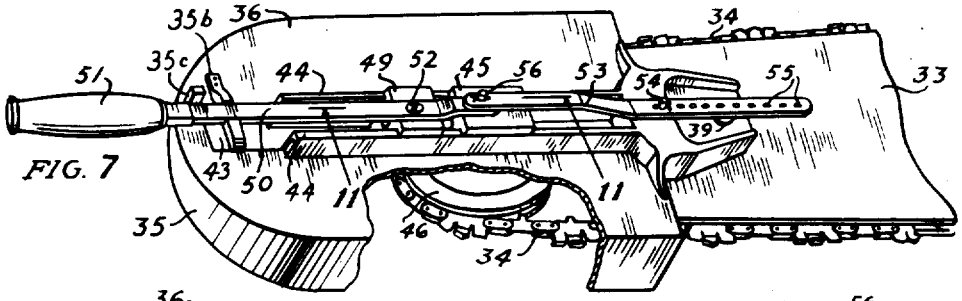
Fig. 7 is an enlarged fragmentary perspective view of the outer end portion of the cutting member shown in Fig. 1.

A sawing machine embodying my invention comprises a base 1 to which is affixed an upright or standard 2 on which is slidably mounted frame 3. Said frame comprises a long bearing 4 for said standard and a bifurcated member 5 to which vertical member 6 is removably attached by screws 7. Trunnions 8 are secured to the inside of said bifurcated member, and to vertical member 6, respectively. Transmission housing 9 is provided with recesses 10 adapted to bear on said trunnions. Thus, with vertical member 6 removed, said transmission housing may be placed in said bifurcated member, and vertical member 6 may then be replaced whereupon said transmission housing will be mounted to rotate freely about trunnions 8.

A gasoline engine 11, or other suitable source of power, is mounted on the rear end of housing 9. I prefer to attach a pair of handles 12 to said engine by a framework 13 which may be made of the tubing commonly used for bicycle frames, and which may be provided with a pair of feet 14 to support said engine when the latter is lowered to the ground. The forward end of transmission housing 9 is provided with a swivel to allow cutting member 15 to rotate substantially about its longitudinal axis. The amount of said rotation may be controlled by pin 16, which is adapted to engage various holes in the rotated member.

The engine and transmission housing hereinbefore described may be of any well known type; hence they are not described in detail. It will be understood that, within said housing, means are provided to connect sprocket 17 with the engine so as to rotate said sprocket at the proper speed, said means preferably including a clutch for disengaging said engine.

To control the height of frame 3, chain 18, or other flexible element, may be attached thereto by means of springs 19. Said chain passes over sprockets 20 and 21 mounted within standard 2, and over sprockets 22 and 23 mounted upon suitable supports and spaced somewhat from said standard. Said standard should be hollow, and said chain should pass through the bore thereof between sprockets 20 and 21. It will be seen that frame 3 may be held at any desired height by securing chain 18 against movement. To so secure chain 18, I prefer to provide a brake for sprocket 21, or for one of the other sprockets engaging said chain, if desired.

The aforesaid brake may comprise a drum 24 and a band 25, therefore, said band being held to prevent rotation of said drum by spring 26. Said drum should be rigidly connected to sprocket 21. To release said brake to permit movement of frame 3, I prefer to provide a foot pedal 27 adapted to stretch spring 28 by means of a suitable cord 28. Said cord may be provided with a turnbuckle 29 to conveniently adjust its length.

Alternatively, said brake may comprise a drum 30 rigidly connected to sprocket 21, and a brake block 31 therefor. Said brake block may be tightened or loosened by thumb screw 32 thereby to hold frame 3, or to permit it to be moved. I prefer to raise frame 3, when beginning to saw a log, and to tilt cutting member 15 upward, pivoting about trunnions 8. Then, as the cutting operation progresses, said cutting member may be tilted downwardly and it may also be lowered by releasing the aforesaid brake. Of course, when falling a tree, frame 3 will not be lowered during the cutting operation; the cut will be made by swinging the cutting member and, if necessary, by moving standard 2. If desired, cutting member 15 may be somewhat heavier than engine 11 in order that the saw will tend to feed itself by pivoting about trunnions 8 when used vertically.

Cutting member 15 comprises a guide plate 33, along the edges of which saw chain 34 is adapted to run, and a tailpiece 35 is removably secured to the outer end thereof. Said tailpiece comprises a body 36 in which are affixed two pins 37 adapted to engage holes 38 in guide 33. When the saw chain is tensioned, by means hereinafter described, the longitudinal thrust is taken by said pins. To hold said guide and said tailpiece together, bolt 39 and nut 40 therefor are provided. Said nut is adapted to pass through enlarged portion 41 of slot 42 in said guide. Thus to remove said tailpiece from said guide, when saw chain 34 is slack, it is only necessary to loosen nut 40 a slight amount, whereupon pins 37 may be disengaged from holes 38 and said tailpiece moved along said guide until nut 40 slips through enlarged portion 41 of slot 42. To remove said tailpiece, it is not necessary to remove nut 40, which would require too much time and also said nut might be lost.

Figure 11:
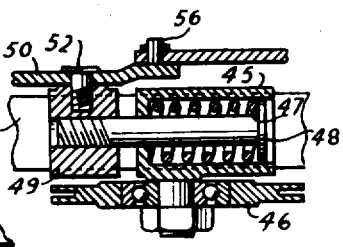
Fig. 11 is a fragmentary sectional detail view taken along the line 11—11 in Fig. 7.
Figure 9:
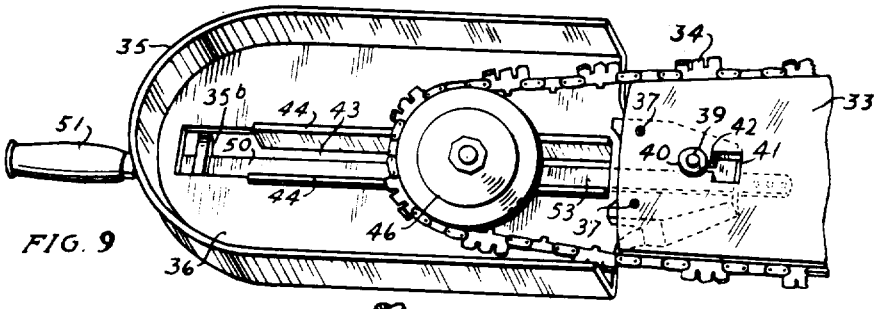
Fig. 9 is a view similar to Fig. 7, the perspective being taken from a different angle.

I will now describe the means that I prefer for tensioning and loosening the saw chain. Body 36 of tailpiece 35 is provided with a slot 43 preferably bounded by brass rails 44. A block 45 adapted to slide in said rails carries a sprocket or sheave 46 over which saw chain 34 runs. Block 45 is hollow, and a spring 47 in the bore thereof is adapted to apply tensioning force to said block by means of screw 48 passing through said spring. See Fig. 11. Screw 48 is threaded into block 49 which slides along rails 44.

Figure 8:
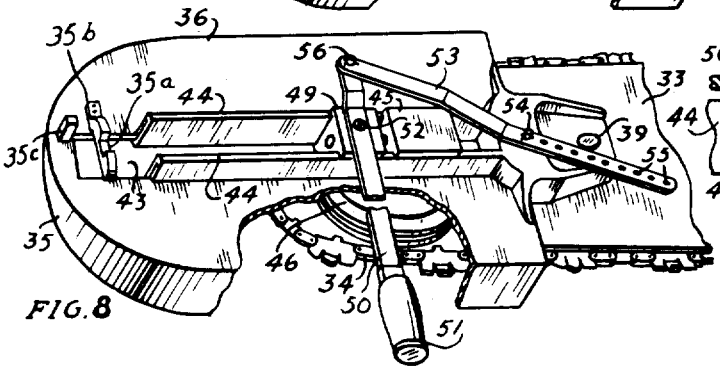
Fig. 8 is a view similar to Fig. 7 but with the handle shown in its released position.
Figure 10:
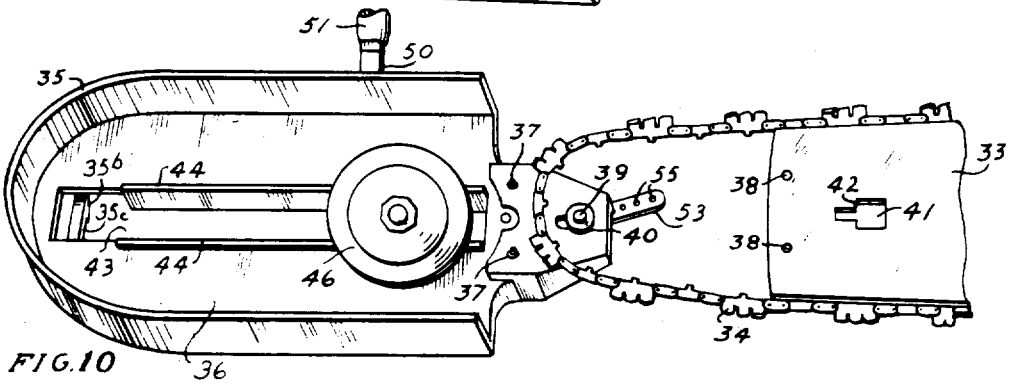
Fig. 10 is a view similar to Fig. 9 but with the handle shown in its released position and the tail-piece shown released from the guide member.

To apply force to block 40 to tension the saw chain, I provide a lever 50 having a handle 51, said lever being connected to block 49 by pivot 52. To anchor lever 50, I provide a strap 53 connected to body 36 by pivot 54. Said strap is provided with a plurality of holes 55 adapted to engage said pivot, thus providing for the adjustment of the length of said strap. Lever 50 and strap 53 are connected by pivot 56. In Fig. 7, the handle is shown in its normal position, the saw chain being under considerable tension, as it should be to operate properly. In Fig. 8, the handle is shown rotated downwardly to release said tension. The tailpiece may then be removed from guide 33, as hereinbefore described and as illustrated in Fig. 10 whereupon said guide and the saw chain may be withdrawn lengthwise from the kerf.

I have thus combined the tensioning function of the saw chain with the function of holding the tailpiece to the guide. That is, when the saw chain is under tension, the thrust of the guide against pins 37 holds the tailpiece and the guide firmly together. However, when said tension is released, said tailpiece may readily be removed. It is desirable to tension the saw chain from the outer end of the cutting member since, if the tensioning means were at the inner end thereof, the guide member would be loosely secured to the transmission housing whereas I prefer to firmly attach said guide to said housing. On the other hand, by tensioning the saw chain at the outer end, it is only necessary to move sheave 48 and its supporting block. If the saw chain were tensioned from the inner end of the cutting member, it would be necessary to move the whole guide member, since sprocket 17 cannot readily be made movable, being connected to the transmission means.

Handle 51 is adapted to engage notch 35a in bracket 35b (Fig. 7) when the saw chain is under tension. When used in the horizontal position, the weight of the cutting member will hold said handle in said notch if the handle is used to support the cutting element. However, when the cutting member is supported by the handle in the vertical position, stop 35c is provided for the handle to bear against, since it might slip out of notch 35a.

When the sawing machine comprising my invention is to be moved any considerable distance, it is desirable that the cutting member be removable from the engine and transmission. To this end, I provide pins 57 in housing 9 adapted to engage suitable holes in guide 33, and I provide a stud 58 in said housing and a nut 59 therefor to hold said guide firmly but removably against said housing.

I will now describe my improved form of saw teeth, referring to Fig. 12. My invention is directed primarily to the sawing of wood cross grain. To accomplish this sawing with a minimum expenditure of power, I first define the saw kerf by cutting two parallel grooves the required distance apart and to a depth of about $\frac{1}{32}$ inch. I cut said grooves by means of two thin cutting teeth 60 and 61, said teeth being alike except that one is left hand and the other right hand. Said cutting teeth have thin edges that cut easily, but that do not dull quickly because of their unusual length.

It has been common practice heretofore to define the saw kerf by means of cutting teeth. However, said cutting teeth have presented points to the wood to be cut instead of long thin blades. There is a material difference in the operation aside from the fact that the long blades cut easier and last longer. Said difference is of particular importance in chain type saws wherein the teeth are not rigidly supported and where, consequently, it is difficult to make said teeth run true. The pointed cutting teeth heretofore used have been well adapted to travel along sharply curved paths. On the other hand, cutting teeth comprising long blades, such as is shown in Fig. 14, would not be suitable for turning sharp corners; they must travel in substantially straight lines. It follows that my cutting teeth will run true even in a chain saw where they are not well supported, whereas pointed teeth would tend to run in irregular paths.

To make the cutting teeth run true, it is desirable that a substantial portion of the cutting edge lie in the groove cut by the preceding portion. In other words, the bottom of the cutting edge should be approximately horizontal, rather than pointed.

It has heretofore been the practice to follow the cutting teeth with some form of raker, usually of the chisel type. The kerf has thus been formed by first defining it by a pair of parallel grooves, and then chiselling out the portion between the grooves. The chiselling member has served the dual purpose of loosening the sawdust and of removing the same from the kerf. I depart from this established practice in that I provide separate teeth for the two aforesaid functions.

Cutting teeth 60 and 61 are followed by a pair of what I call router teeth 62 and 63. The purpose of said router teeth is not to remove sawdust from the kerf; it is merely to cut loose the pieces of wood that have been defined by the cutting teeth, by a slicing operation. Said teeth 62 and 63 are similar, differing in one respect in that one is left-hand while the other is right-hand, and differing furthermore in that tooth 63 is somewhat wider than tooth 62, for reasons hereinafter discussed.

As is shown in Figs. 15 and 16, said router teeth comprise vertical members 64 formed integrally with horizontal members 65, thus providing a tooth which is L-shaped in vertical section so that the shank of the L may travel in one of the grooves formed by a preceding slitting tooth 60 or 61. The forward edge of each of said members is sharpened. The position of the cutting edge on the front of member 65 is a matter of importance. I prefer that members 64 and 65 be formed substantially at right angles to each other though this is not essential. However, shank member 64 is not exactly vertical, being tilted as shown in Fig. 17 so that only the distance between the heels of the L's equals the lateral spacing of the cutting edges of the slitting knives 60, 61 so as to provide proper clearances from the side walls of the kerf. It would seem, then, that the sharpened forward edge of the member 65 would be correspondingly tilted with respect to the horizontal so that the kerf would be deeper in the center than at its edges. Such is not the case, however, because said sharpened forward edge is not square; it is inclined backward. Because member 65 is inclined upward (Fig. 16), from front to rear, this backward inclination of the cutting edge results in a substantially flat-bottomed kerf. The bottom surface of teeth 62 and 63 is inclined in two directions with respect to the horizontal bottom of the kerf, namely, from side to side and from front to rear. The cutting edge is formed at such an angle that it is substantially horizontal. This results in a flat bottomed kerf, which is desirable; it gives a sloping cutting edge, which is also desirable; and at the same time it provides clearance back of the cutting edge, which reduces friction.

Cutting teeth 60 and 61 are rigidly connected with therefore are both mounted on or integral with link members 66. Router teeth 62 and 63 are also rigidly connected, both being mounted on or integral with other link members 66. Another tooth 67 is rigidly mounted on the forward portion of each of said link members 66. Although a tooth 67 is used ahead of the cutting teeth and also in front of the router teeth, it performs somewhat different functions in the two cases. As used in front of the cutting teeth, it serves the purpose of a drag, that is, it removes the sawdust from the kerf; its function is to transport sawdust that has been loosened by the router teeth ahead. It also serves as a depth gage to limit the depth of cut of teeth 60 and 61. As used in front of the router teeth, tooth 67 serves solely as a depth gage. Since a chain type saw is more or less flexible, it is desirable to place a depth gage upon each link member that carries router teeth. Although said router teeth are highly efficient, cutting fast with little power, they have the inherent property of tending to draw themselves more deeply into the wood. Without a depth gage to control this tendency, the operation of said teeth would be unsatisfactory in that they would tend to jump along the wood instead of cutting smoothly. On the other hand, with a depth gage to control the depth to which said teeth may cut, this tendency of said router teeth to draw themselves toward the wood is highly advantageous since it results in a very steady cutting operation. A nice control of the depth of cut, and a uniform depth of cut for all teeth is essential for efficient sawing.

I find it convenient to utilize the same kind of teeth for both clearing the kerf of sawdust, and serving as a depth gage. The corners of the teeth used as depth gages should be rounded so they will slide readily. Raker teeth heretofore known have necessarily been sharpened. However, the router teeth hereinbefore described pass under the material being separated from the bottom of the kerf so that it is readily removable by the rounded drag teeth. I find that this arrangement results in the sawdust being cleared from the kerf effectively without interfering with the cutting operation, and there is no tendency for said sawdust to be carried around the saw to re-enter the kerf; the rounded drag teeth readily release the sawdust.

As mentioned, tooth 62 is somewhat narrower than tooth 63. This serves to balance the draft of the link member to which said teeth are attached. Tooth 62 being ahead of tooth 63 lifts up one edge of the sawdust. Thereafter tooth 63 lifts up one edge of the sawdust. If both teeth were of the same width, more force would be required to move tooth 62, and said teeth would tend to run to one side. I deem it of considerable importance that the draft of each link member be balanced, since difficulty will otherwise be encountered in making the chain saw run true. To this end, I also stagger teeth 67, that is, I place the tooth 67 that follows the router teeth on the side of link member 66 opposite tooth 63 since said tooth 63 tends to throw the sawdust to that side, and I then place the next tooth 67 on the opposite side of link member 66.

It will be understood that link members 66 form a part of an otherwise conventional saw chain. I prefer to provide tabs 68 on the backs of said link members. Said tabs ride in and are guided by slot 69 formed in guide plate 33. If desired, said guide plate might be of the well known laminated construction, slot 69 being formed by a narrow lamination.

It will be noted that the laterally projecting toe 65 of each of the L-shaped teeth 62 and 63 is also relatively thin and that its forwardly-presented edge is formed by beveling downward the forward portion of the upper surface of the toe and that the trailing portion of the upper surface of this toe therefore lies at a flatter angle—relative to the bottom of the kerf—than said beveled surface and that this trailing portion has no tendency to engage the material which is being separated from the work piece at the bottom of the kerf. It will also be noticed that the tooth 67 which is rigidly associated with the trailing tooth pair 60, 61 is longitudinally separated from the next forward tooth 63. As a result of this arrangement, the bottom-forming teeth 62, 63 have no tendency, on the material which is being separated from the bottom of the kerf, to crowd that material into the interstices of the chain, and that, on the contrary, ample space for the separated material is provided between tooth 63 and the trailing clearing tooth 67, so that the said trailing tooth 67 may carry the separated material out of the kerf without choking. The term "L-shaped" is intended as descriptive of a cutting element having a shank intended to travel in a plane closely approximating the plane of a side wall of a kerf or cut produced by the saw, and a toe extending laterally from the shank at a substantial angle to the plane of the shank and toward the opposite side wall of the kerf to serve as a bottom-defining element for the kerf.

I claim:

1. In a chain saw, a plurality of pivotally joined links, certain of said links having formed thereon angularly disposed slicing elements extending from one marginal edge of said chain saw towards the longitudinal centerline of said chain saw, said slicing elements having transverse, bottom routing edges formed thereon, said slicing elements being arranged in pairs oppositely disposed and spaced laterally apart, and others of said links having formed thereon side cutters having cutting edges lying at the marginal edges of said chain saw.

2. In a chain saw, a plurality of pivotally joined links, certain of said links having formed thereon angularly disposed slicing elements extending from one marginal edge of said chain saw towards the longitudinal centerline of said chain saw, said slicing elements having transverse, bottom routing edges formed thereon, said slicing elements being arranged in pairs oppositely disposed and spaced laterally apart, said slicing elements also being longitudinally spaced apart, and others of said links having formed thereon side cutters having cutting edges lying at the marginal edges of said chain saw.

3. In a chain saw, a plurality of pivotally joined links, certain of said links having formed thereon angularly disposed slicing elements extending from one marginal edge of said chain saw towards the longitudinal centerline of said chain saw, said slicing elements having transverse, bottom routing edges formed thereon, said slicing elements being arranged in pairs oppositely disposed and spaced laterally apart and being secured to a common link, said slicing elements also being longitudinally spaced apart, a depth gage also carried by said common link being spaced ahead of the more forwardly arranged slicing element on said link, and others of said links having formed thereon side cutters having cutting edges lying at the marginal edges of said chain saw.

4. In a chain saw, a plurality of pivotally joined links, certain of said links having formed thereon angularly disposed slicing elements extending from one marginal edge of said chain saw towards the longitudinal centerline of said chain saw, said slicing elements having transverse, bottom routing edges formed thereon, said slicing elements being arranged in pairs oppositely disposed and spaced laterally apart and being secured to a common link, others of said links having formed thereon side cutters having cutting edges lying at the marginal edges of said chain saw, and said side cutters also being arranged in pairs, the side cutters in each pair lying at opposite marginal edges of the chain saw.

5. In a chain saw, a plurality of pivotally joined links, certain of said links having formed thereon angularly disposed slicing elements extending from one marginal edge of said chain saw towards the longitudinal centerline of said chain saw, said slicing elements having transverse, bottom routing edges formed thereon, said slicing elements being arranged in pairs oppositely disposed and spaced laterally apart and being secured to a common link, others of said links having formed thereon side cutters having cutting edges lying at the marginal edges of said chain saw, said side cutters also being arranged in pairs, the side cutters in each pair lying at opposite marginal edges of the chain saw, and depth gages arranged substantially at the centerline of said chain saw and carried by a side-cutter link and constituting drags to remove cuttings produced by the slicing elements lying forwardly thereof.

6. In a chain saw, a plurality of pivotally joined links, certain of said links having formed thereon angularly disposed slicing elements extending from one marginal edge of said chain saw towards the longitudinal centerline of said chain saw, said slicing elements having transverse, bottom routing edges formed thereon, said slicing elements being arranged in pairs oppositely disposed and spaced laterally apart and being secured to a common link, said slicing elements also being longitudinally spaced apart, others of said links having formed thereon side cutters having cutting edges lying at the marginal edges of said chain saw, said side cutters also being arranged in pairs, the side cutters in each pair lying at opposite marginal edges of the chain saw, and depth gages arranged substantially at the centerline of said chain saw and carried by side-cutter links and constituting drags to remove cuttings produced by the slicing elements lying forwardly thereof.

7. A saw element comprising two allochiral laterally spaced and longitudinally spaced L-shaped teeth, the toes of which are directed toward a median plane and are provided with forwardly presented lateral chisel edges, and a rigidly-associated depth gauge tooth in advance of the chisel edge of the forward one of said L-shaped teeth and medially positioned relative to the lateral spacing of said L-shaped teeth.

8. A saw element comprising two allochiral laterally spaced and longitudinally spaced L-shaped teeth, the toes of which are directed toward a median plane and are provided with forwardly presented lateral chisel edges and the shanks of which, immediately adjacent the toe, are provided with forwardly presented vertical chisel edges, and a rigidly-associated depth gauge tooth in advance of the chisel edge of the forward one of said L-shaped teeth, and medially positioned relative to the lateral spacing of said L-shaped teeth.

[9. A saw tooth comprising a shank and a laterally extended toe lying at a substantial angle to the shank and having a forwardly presented chisel edge extending from the free end of said toe to the junction of said toe with the shank and at the lowermost part of the tooth.]

[10. A saw tooth comprising a shank having a forwardly-presented chisel edge adjacent its free end and a laterally extended toe lying at a substantial angle to the shank and having a forwardly-presented chisel edge at the lowermost part of the tooth and extending from the free end of said toe to the junction of said toe with the shank.]

11. A saw having successive tooth groups, each comprising a pair of laterally spaced allochiral slitting teeth and a longitudinally spaced trailing kerf-bottom-defining L-shaped tooth, the toe of said L projecting laterally from the shank toward the median plane between the slitting teeth and having a forwardly-presented chisel edge at the lowermost part of the tooth and the shank of said L being arranged to trail in the path of movement of one of said slitting teeth.

12. A saw having successive tooth groups, each comprising a pair of laterally spaced allochiral slitting teeth and a longitudinally spaced trailing kerf-bottom-defining L-shaped tooth, the toe of said L projecting laterally from the shank toward the median plane between the slitting teeth and having a forwardly-presented chisel edge at the lowermost part of the tooth and the shank a forwardly-presented edge immediately adjacent the chisel edge of the toe, the shank of said L being arranged to trail in the path of movement of one of said slitting teeth.

[13. A saw having an L-shaped kerf-bottom-defining tooth wherein the toe of the L projects laterally from the shank and has a forwardly-presented lateral chisel edge at the lowermost part of the tooth.]

[14. A saw having an L-shaped kerf-bottom-defining tooth wherein the toe of the L projects laterally from the shank and has a forwardly-presented lateral chisel edge at the lowermost part of the tooth and the shank immediately adjacent the toe has a forwardly-presented vertical chisel edge.]

15. A saw having successive tooth groups each comprising a pair of laterally-spaced allochiral slitting teeth, and a trailing allochiral pair of laterally-spaced and longitudinally-spaced L-shaped teeth the toe of each of said L's projecting laterally toward a median plane and having a lateral forwardly-presented chisel edge at the lowermost part of the tooth, the shanks of said L's being respectively arranged to trail in the paths of the slitting teeth.

16. A saw having successive tooth groups each comprising a pair of laterally-spaced allochiral slitting teeth, and a trailing allochiral pair of laterally-spaced and longitudinally-spaced L-shaped teeth the toe of each of said L's projecting laterally toward a median plane and having a forwardly-presented chisel edge at the lowermost part of the tooth and the shank a forwardly-presented vertical chisel edge immediately adjacent the chisel edge of the toe, the shanks of said L's being respectively arranged to trail in the paths of the slitting teeth.

17. A saw having successive tooth groups each comprising a pair of laterally-spaced allochiral slitting teeth, and a trailing allochiral pair of laterally-spaced and longitudinally-spaced L-shaped teeth the toe of each of said L's projecting laterally toward a median plane and having a lateral forwardly-presented chisel edge at the lowermost part of the tooth, the shanks of said L's being respectively arranged to trail in the paths of the slitting teeth, and a depth-limiting raker tooth arranged rigidly associated with the L-shaped teeth and longitudinally spaced between an L-shaped tooth and a slitting tooth.

18. A saw having successive tooth groups each comprising a pair of laterally-spaced allochiral slitting teeth, a trailing allochiral pair of laterally-spaced and longitudinally-spaced L-shaped teeth the toe of each of said L's projecting laterally toward a median plane and having a lateral forwardly-presented chisel edge at the lowermost part of the tooth and the shank a vertical forwardly-presented chisel edge immediately adjacent the chisel edge of the toe, the shanks of said L's being respectively arranged to trail in the paths of the slitting teeth, and a depth-limiting raker tooth rigidly associated with the L-shaped teeth and arranged longitudinally between an L-shaped tooth and a slitting tooth.

*19. In a saw chain, a plurality of pivotally joined links, certain of said links each carrying saw teeth comprising a generally vertically disposed shank extending from the link to the outermost limit of the tooth and having a forwardly presented chisel edge adjacent its free end and a substantially horizontal toe projecting transversely from the shank and terminating at a free end spaced from all other portions of the link on which the respective tooth is formed and said toe having a forwardly presented chisel edge at the lowermost part of the tooth and extending from the free end of said toe to the junction of the toe with the free end of the shank.*

*20. In a saw chain, a plurality of pivotally joined links, certain of said links each carrying an L-shaped kerf-bottom-defining tooth with a generally vertically disposed shank extending from the link to the outermost limit of the tooth wherein the toe of the L projects laterally and substantially horizontally from the shank and has a forwardly presented chisel edge at the lowermost part of the tooth, and the shank immediately adjacent the toe has a forwardly presented chisel edge, said chisel edges of certain of said shanks being laterally offset from the median plane of the chain in one direction and said chisel edges of others of said shanks being laterally offset from the median plane of the chain in the opposite direction.*

*21. In a saw chain, a plurality of pivotally joined links carrying a plurality of saw teeth and a plurality of depth gauges in longitudinally spaced relation to said teeth, each of said teeth comprising a generally vertically disposed shank having a forwardly presented chisel edge at its free end and extending into a plane parallel with the median plane of the chain and spaced laterally from said median plane farther than any other portion of the chain and a toe laterally extending towards the median plane of the chain and lying at a substantial angle to the shank and having a forwardly presented chisel edge at the lowermost part of the tooth and extending from the free end of said toe to the junction of said toe with the free end of the shank, the chisel edges on the shanks of certain of said teeth being laterally offset from the median plane of the chain in one direction and the chisel edges of the shanks of others of the teeth being laterally offset from the median plane of the chain in the opposite direction.*

References Cited in the file of this patent or the original patent

UNITED STATES PATENTS

| | | |
|---|---|---|
| 323,602 | Shipe | Aug. 4, 1885 |
| 1,483,387 | Serin | Feb. 12, 1924 |
| 1,745,090 | Geithle | Jan. 28, 1930 |

UNITED STATES PATENT OFFICE

CERTIFICATE OF CORRECTION

Reissue No. 24,129

March 13, 1956

John E. Hassler, deceased,
by Borg-Warner Corporation

It is hereby certified that error appears in the printed specification of the above numbered patent requiring correction and that the said Letters Patent should read as corrected below.

Column 3, line 25, for "spring 28" read --spring 26--; line 72, for "block 40" read --block 49--; column 5, line 54, for "connected with" read --connected and--.

Signed and sealed this 3rd day of July 1956.

(SEAL)

Attest:

KARL H. AXLINE

Attesting Officer

ROBERT C. WATSON
Commissioner of Patents